Figure 5:
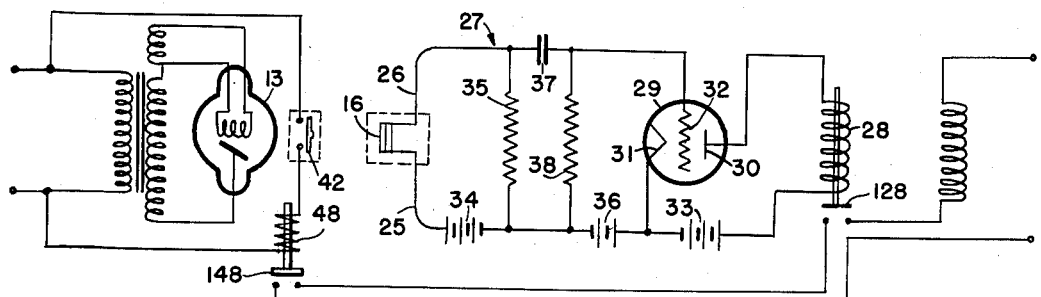

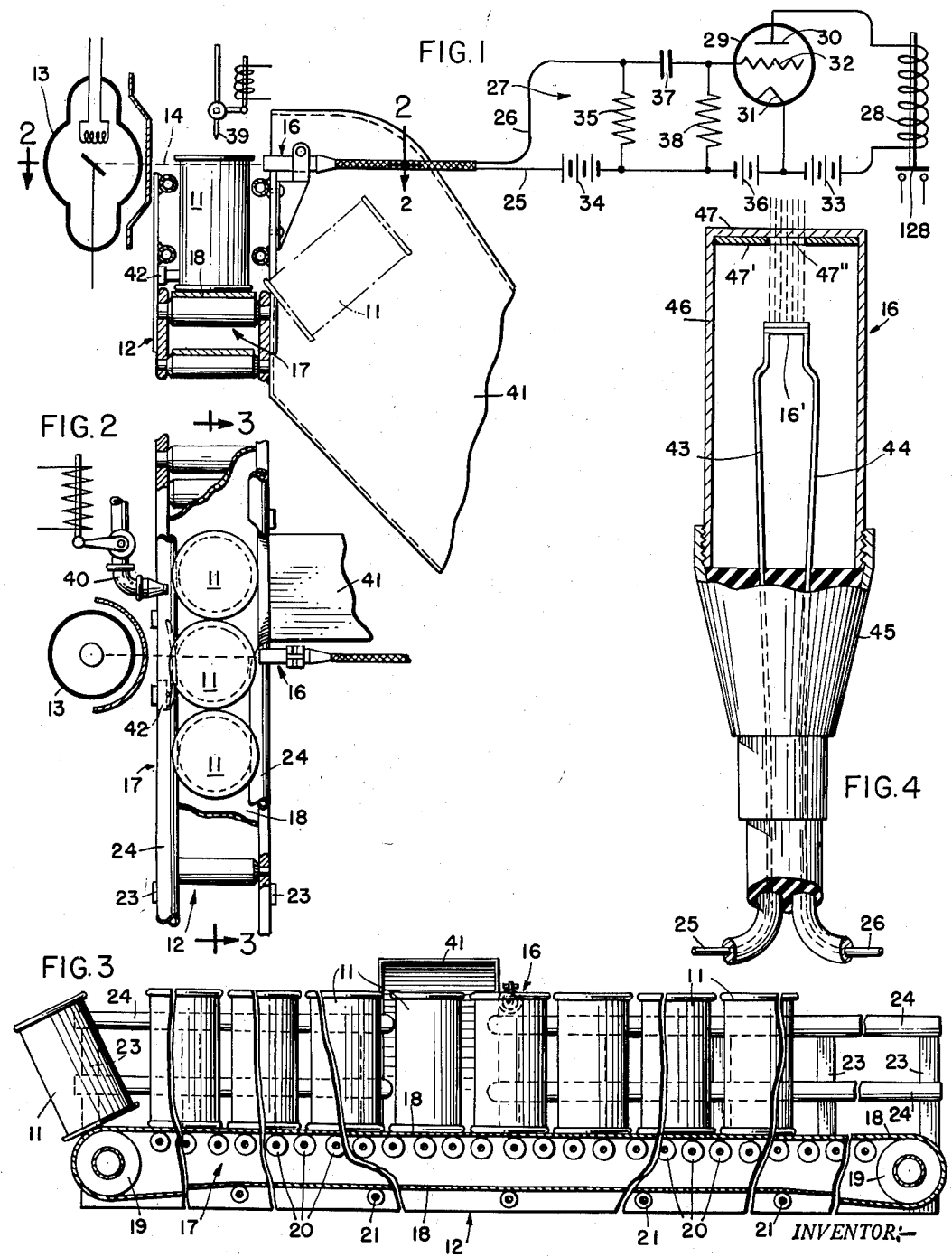

Jan. 24, 1956  J. E. JACOBS  2,732,503
INSPECTION DEVICE

Filed Jan. 24, 1952  2 Sheets-Sheet 2

INVENTOR:—
JOHN E. JACOBS
BY:
Junius F. Cook, Jr.
ATTORNEY

United States Patent Office 2,732,503
Patented Jan. 24, 1956

2,732,503

INSPECTION DEVICE

John E. Jacobs, Milwaukee, Wis., assignor to General Electric Company, a corporation of New York Application January 24, 1952, Serial No. 267,947

18 Claims. (Cl. 250—52)

The present invention relates in general to inspection apparatus, and has more particular reference to equipment for determining the depth of fill of material in containers, including beer and other liquids of the sort packaged in metal cans or other containers of material opaque to visible light rays, the invention, of course, being also applicable to the determination of filling depth in containers where the contents thereof are of non-liquid character, including viscous and semi-solid fluids, and solid material in granular, amorphous, powdery, or other subdivided condition.

An important object of the invention is to provide penetrating ray apparatus for scanning containers in rapid succession to determine the depth to which the containers are filled; a further object being to provide means for directing a narrow penetrating ray beam upon a suitable ray sensitive element, at a level corresponding with the minimum depth to fill to be gauged, in combination with conveyor means for traveling the containers to be inspected successively through the beam, the equipment including reject means controlled by the sensitive element and operable to indicate or reject a container in which the fill level of the contents thereof is at other than a predetermined elevation; a further object being to provide for the ejection of incorrectly filled containers from the conveyor means in response to the operation of such reject means.

Another important object is to provide means for distinctively marking incorrectly filled containers on the conveyor means in response to the operation of the reject means.

Another important object is to provide penetrating ray means and a ray sensitive element, whereby the fill level in containers may be gauged in terms of relative ray intensity impinging on the sensitive element, after passing through a container being inspected, either above or below the fill level of contents therein, the sensitive element being controllingly connected with normally inactive reject equipment operable to mark or otherwise reject the inspected container in response to the change of intensity of the penetrating beam as it passes through the container, either above or below the level of contents therein, whereby the sensitive element is irradiated either with rays of relatively high intensity, or with rays of relatively lower intensity as the result of the ray screening effect of the container contents.

Another important object is to provide for the successive inspection of containers in apparatus of the character mentioned, wherein the containers follow one another at spaced intervals, including switch means for rendering the inspection equipment inoperative except when a container is in inspecting position in the penetrating ray beam, whereby to avoid false operation of the reject mechanism as the result of ray impingement at maximum intensity on the sensitive element during an interval between successive spaced apart containers.

Another important object is provide inspection equipment comprising a suitable source of penetrating rays, such as X-rays, and ray sensitive detecting means spaced from the source and arranged to discriminate between the relatively small changes in ray intensity reaching the detecting means through the container being inspected either above or below the contents thereof, including means for confining the penetrating ray as a substantially narrow ray pencil, and conveyor means for traversing containers to be inspected transversely between the ray source and the detecting means at such a level as to apply the beam through the containers at the desired fill level therein, whereby the ray will pass to the detecting means through the contents of the containers only if the same are filled to or above a desired fill level, and otherwise will pass to the detecting means through the containers above the fill level therein, thereby allowing for differentiation between properly and improperly filled containers in terms of the ray intensity impinging on the detecting means after passing through or scanning the containers; a further object being to provide means which may be employed to detect either containers which are insufficiently filled, below a desired level, or containers which are incorrectly filled, above a desired level.

Another important object is to employ a suitable semiconductor material, such as cadmium or mercury sulphide or cadium selenide, as an X-ray sensitive detector for determining the slight changes in the intensity of X-rays impinging thereon, after passing through containers either above or below the fill level of the contents therein; a further object being to provide suitable translation means for indicating changes in ray intensity impinging on the detector element in terms of the variation in the electrical impedance of the sensitive material comprising the detector; a still further object being to utilize the ray responsive current carrying characteristics of the sensitive detector material for the control of operable equipment adapted to mark or otherwise accomplish the rejection of an incorrectly filled container scanned by the inspecting ray.

The foregoing and numerous other important objects, advantages, and inherent functions of the invention will become apparent as the same is more fully understood from the following description, which, taken in connection with the accompanying drawings, discloses a preferred embodiment of the invention.

Figure 6:
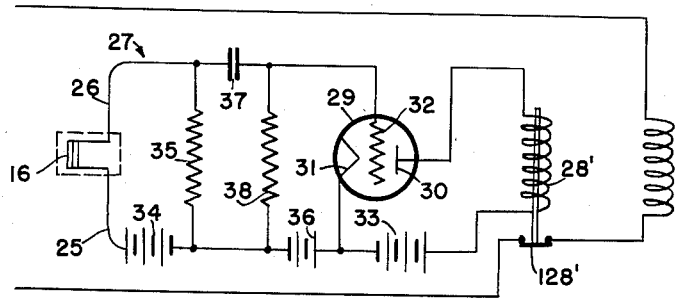
Figure 7:
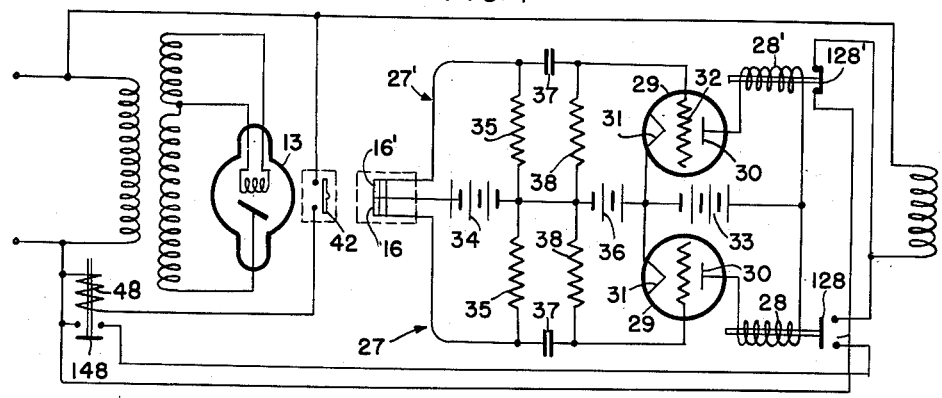

Referring to the drawings:

Fig. 1 is a diagrammatic view of inspection apparatus embodying the present invention, including conveyor means for traveling containers in succession past the inspection apparatus;

Figs. 2, 3, and 4 are sectional views taken, respectively, substantially along the lines 2—2 in Fig. 1, 3—3 and 4—4 in Fig. 2; and Figs. 5, 6 and 7 are diagrams of electrical circuits which may be employed for the operation of equipment in accordance with the teachings of the invention.

To illustrate the invention, the drawings show apparatus for inspecting containers 11 in order to determine whether or not the same are filled to a desired level. The invention is not necessarily restricted to the inspection of any particular kind of container, nor limited to the detection of insufficiently filled containers, but may, indeed, be employed in detecting containers that are improperly filled above a desired level, or containers which are incorrectly filled either above or below a desired level. The article 11, as shown, may comprise a metal can of the sort commonly employed as a container for beer, oil, or other liquid products. In the packaging of fluid products in light opaque containers, it is exceedingly desirable, after the container has been filled with its contents and sealed, to be able to determine the fill level of the contents within the container in order that insufficiently filled containers may be rejected and withheld from shipment from the packaging factory or establishments; and the present invention provides exceedingly effective means well suited to the examination and successive inspection of containers at relatively high rates of speed, well in excess of twenty containers inspected per second, for the determination of the fill level of contents therein and the rejection of insufficiently filled containers.

As shown more particularly in Fig. 1, the container 11 may be mounted on any suitable support means 12 adapted to carry the container in position to be inspected. The inspection equipment may comprise a suitable source of penetrating rays, such as may be provided by a conventional X-ray tube 13, having a cathode and a cooperating anode adapted to constitute an X-ray source when energized by the impingement of electrons emitted by the cathode. The ray source 13 may be mounted on suitable support means in position to direct a ray beam 14 through a suitable collimator, which may comprise an opening in a screen 15 of ray impervious material, such as lead, the opening being disposed in position to transmit the beam 14 as a ray pencil transversely through the container being inspected toward an X-ray sensitive element 16, suitable mounted and supported on the side of the container 11 remote from the X-ray source. If desired, additional collimator means, preferably comprising a plate of ray impervious material formed with a collimator opening, may be interposed between the sensitive element 16 and the article to be inspected.

The sensitive element 16 thus may be irradiated by the pencil-like beam 14 only after the same has passed through the container 11. The container 11, of course, may be mounted on the support means 12 at such elevation that the ray beam pencil will pass transversely through the container at the level to which it is desired that the container be filled. Accordingly, if the container be filled to such level, the ray beam pencil will have to travel through the walls of the container as well as its contents in reaching the sensitive detector element 16. If, however, the container be insufficiently filled, the ray beam pencil will pass only through the walls of the container, above the level of contents therein. Accordingly, if the container is filled to or above a desired minimum level, the intensity of the ray pencil impinging upon the element 16 will be detectibly lower than the intensity of the ray pencil impinging on the element where the container is insufficiently filled.

It will be understood of course that the inspection equipment, including particularly the ray source 13, the sensitive detector element 16, and the collimator means 15, is preferably mounted at a fixed elevation with respect to the support means 12 in order to gauge the fill level in a series of identical containers. It may, however, be desirable to provide for the vertical adjustment either of the support means 12 or of the inspection equipment where it is desired to accommodate different containers, or containers in which the desired fill level changes from time to time. Ordinarily, however, the invention may desirably be embodied in equipment wherein the relative elevation of the inspection equipment and the support means 12 remains constant, although, of course, the invention is not limited to such fixed elevation relationship, but contemplates the possibility of adjusting the support means vertically with respect to the inspection equipment, or vice versa.

The present invention is particularly well adapted for the inspection of like containers at high speed by forming the support means 12 as a traveling conveyor whereon to transport a plurality of containers 11 in endless and rapid succession transversely through the inspecting ray beam pencil 14, to the end that said beam may scan the containers in rapid succession. To this end, the support means 12 may comprise a conveyor 17, which may conveniently embody an endless belt 18 traveling around spaced end rollers 19, one or both of which may be driven in order to travel the belt. The upper stretch of the belt may be supported on a plurality of transverse idler rollers 20, and the lower or return stretch of the belt also may be supported on rollers 21. The rollers 19, 20 and 21 may be mounted in a frame, comprising side bars 22 carrying upstanding posts 23 at spaced intervals therein on opposite sides of the belt 18, said posts in turn carrying longitudinally extending rails 24 for the guidance and support of containers being transported by the belt 18.

The ray source 13 may be mounted on one side of the conveyor, by suitable bracket means, which may provide for the vertical adjustment of the ray source with respect to the conveyor means. The sensitive detector means 16 likewise may be mounted on the side of the conveyor structure opposite from the ray source, in suitable bracket means providing for the adjustment of the detector element vertically with respect to the conveyor structure, if desired.

The ray sensitive element 16 preferably comprises a crystal or crystals of a suitable ray sensitive semi-conductor material, such as cadmium or mercuric sulphide or cadmium selenide. For the purpose of explaining the present invention, a semi-conductor may be defined as a substance having electrical resistance or reactance, or both, which vary in accordance with the intensity of rays to which the substance is exposed, the combined electrical resistance and reactance of a conductor being commonly referred to as the impedance thereof. Cadmium and mercury sulphides, and cadmium selenide, in this respect, have been found to be semi-conductors usefully sensitive to X-rays, the same in the absence of X-rays having impedance characteristics of such high order as to constitute the same as virtual insulators capable of substantially preventing the flow of electrical energy therethrough. The electrical characteristics of the named materials are such that the impedance thereof progressively declines or becomes reduced in proportion to the intensity of X-rays impinging thereon and, as more fully explained in copending applications for U. S. Letters Patent Serial No. 190,801, filed October 18, 1950, Patent No. 2,706,790, and Serial No. 232,073, filed June 18, 1951, Patent No. 2,706,791, the intensity of impinging X-rays may be accurately measured in terms of the apparent impedance of the sensitive semi-conductor element 16.

The named semi-conductors may also be distinguished from commonly known semi-conductors in that they exhibit current amplifying characteristics when irradiated with X-rays. Semi-conductors operate as such through the release of electrons, entrapped therein, when subjected to energy rays to which sensitive. Commonly known semi-conductors, such as selenium, none of which are to any appreciable or useful extent sensitive to penetrating rays, such as X-rays, operate to release electrons in direct proportion to changes in the electrical space charge of the material, as the result of ray impingement thereon, and thus do not show current amplifying characteristics. The sulphides of cadmium and mercury, however, as well as the selenide of cadmium, release many thousands or hundreds of thousands of electrons in response to unit alteration of the space charge therein, when excited by penetrating rays, including X-rays, to which said materials are sensitive. The sensitive element 16 thus, in effect, comprises a tiny amplifier capable of delivering a substantial quantity of electrical current when excited by X-rays.

It is thought that the amplifying character of the crystals is due to the fact that cadmium and mercury sulphide and cadmium selenide comprise what may be called excess electron or electron donor semi-conductors, the excess energy necessary to produce amplified currents in the crystal being derived from the electron producing character of the material itself, when irradiated or triggered by exposure to X-rays. It is suggested that electron donor centers in each crystal become ionized by the impinging X-rays, thus forming stationary positive space charges in the material. The amplifying character of these electron donor materials can be compared to that of a conventional triode tube where the grid is assumed to be floating. In such a tube the grid takes up a negative charge as the result of electron flow therein, thus reducing the plate current to a small value. If the grid of such a tube is charged positively, the current flow therein will materially increase. In electron donor type of crystal material, the conduction electrons are, to a large extent, localized in traps, thus forming a current-reducing, stationary, negative space charge. Upon ray impingement on the crystal, its electron donor centers become ionized, thus assuming positive charges. These stationary positive charges are thought to act in the same way as do positive charges on the grid of a triode tube. One positive hole, or center, so established in the crystal, appears to control the flow of more than ten thousand electrons in the crystal. This is in contradistinction to the action of ordinary photo-sensitive conductors, such as selenium, where this amplification mechanism is absent. As a consequence, electrical energy is released in the electron donor type of crystal material in the form of crystal current that is many times the energy applied to the crystal by the exciting ray, the action being such as to render these electron donor semi-conductors detectably sensitive to X-rays.

X-ray sensitive crystals of cadmium and mercury sulphide and of cadmium selenide may be grown in the form of hexagonal prisms, by vapor phase procedures. Such a crystal may be electrically connected at its opposite ends with suitable conductors 25, 26, as by coating the opposite ends of the crystal each with a layer or plate of electrical conducting material, with which the conductors 25 and 26 may be electrically joined; and the present invention utilizes the semi-conducting and amplifying characteristics of the crystal element 16 for differentiating the intensity of X-rays reaching the crystal either through the contents of the containers 11 or through the containers above the contents thereof, by providing for measuring the apparent impedance of the sensitive element. Any substantial decrease of the so measured impedance of the element 16 will indicate an increase in the intensity of the impinging ray beam, and consequently will show that the beam is reaching the sensitive element without passing through the contents of the container.

Any suitable or preferred means may be employed for determining the impedance of the element 16, in order thus to ascertain whether or not the contents level in a container under inspection is at a desired elevation in the container. As shown, such means may comprise an electronic translation system 27 adapted to actuate a suitable load device 28, which may serve to operate any desired type of indicating, recording, container marking or rejecting equipment, or other mechanism which it may be desired to operate in response to the detection of an improperly filled container. The translation system 27 preferably comprises an electron flow amplifier 29 having an anode 30, an electron emitting cathode 31, and a flow regulating grid 32, the plate and cathode being interconnected in an output circuit, including a suitable power source 33 and the load device 28 to be operated. The control grid 32 may be interconnected with a grid control circuit in which the sensitive crystal element 16 is also operatively connected, whereby to electrically energize the grid 32 for the control of the output circuit of the tube in accordance with the transitory impedance value of the crystal 16.

To this end, the control grid circuit may comprise the sensitive crystal 16, a preferably uni-directional power source 34, and a ballast or control resistor 35, interconnected in series, so that electrical potential corresponding with the impedance value of the crystal may be developed across the resistor 35, for application between the cathode 31 and the control grid 32. In order to thus control the grid 32, the cathode 31 may be connected with one end of the resistor 35, as through a suitable source of grid biasing power 36. The other end of the resistor may be connected with the grid 32 through a condenser 37, in order to operate the amplifier 29 only in response to the fluctuating component of crystal current in the grid control circuit, biasing power from the source 36 being applied to the grid 32 through a resistor 38.

It should be understood that current flowing in the crystal 16 will include a uni-directional component as well as a fluctuating component, the fluctuating component being induced by the fluctuating character of the X-ray beam where the same is produced by a conventional X-ray tube energized by alternating current power at an alternating frequency of 60 cycles. Where the source 13 is of a sort producing X-rays of uniform, non-fluctuating intensity, there will, of course, be no fluctuating component of crystal current in the translation system.

As explained in said copending applications aforesaid, high speed detection response of the inspection equipment is accomplished with the alternating component of crystal current, the crystal response in terms of uni-directional current being considerably slower. Accordingly for high speed scanning requiring substantially instantaneous crystal response, it is desirable to employ the A. C. component of crystal current only, although it is not necessary to apply a light bias on the crystal to obtain optimum sensitivity and speed response, as described in said copending applications aforesaid, since the crystal 16 is more or less continuously excited by the beam 14 in the here disclosed inspection apparatus. For certain slow speed inspection purposes it is, of course, possible to employ the uni-directional component of crystal current for operating the amplifier tube 29, by eliminating the condenser 37 and resistor 38 and connecting the resistor 35 directly with the grid 32. Such connection, however, would materially reduce the speed of response of the inspection equipment, and is undesirable for inspection purposes at high speed.

The load device 28 may comprise any preferred mechanism for controlling the operation of suitable means for marking or otherwise indicating or rejecting an incorrectly filled container as or immediately after the same is scanned by the beam 14. To this end, the load device 28 may comprise a relay including a switch 128, and the marking device may comprise a spray nozzle 39 having an operating coil controlled by the switch 128, to cause the nozzle to eject a blob or spray of paint or other marking material upon the incorrectly filled container. Of course, any suitable marking means, other than a paint spray, may be employed and its operation controlled by the switch 128.

Alternately, the device 28 may be arranged to operate automatic means for ejecting an insufficiently filled container from the conveyor 17 as such container leaves the inspection station. To that end, the retaining walls 24 on one side of the conveyor structure may be omitted at an ejection station. At said ejection station an air jet nozzle 40 may be mounted, in the conveyor structure, on the side thereof opposite from the gap formed in the retaining rails; and the load device 28 may be connected to operate the air jet in order to direct a blast of air against one side of an improperly filled container, whereby to blow the container laterally from the conveyor, through said gap and into a rejection chute 41, thus automatically removing the improperly filled container from the conveyor. Properly filled containers, of course, may be delivered from the inspecting and ejecting stations to the discharge end of the conveyor.

Any suitable means may be provided for mounting and supporting the sensitive detector element 16. As shown more particularly in Fig. 4 of the drawings, the element 16 may be mounted on and supported by the conductor members 43 and 44, formed as support pedestals anchored on and suitably insulated from a mounting base 45, which base may provide means for electrically connecting the conductor pedestals 43 and 44, respectively, with the conductors 25 and 26. The base 45 may be formed for the detachable reception of a cover 46 in position enclosing and protecting the element 16 and its supporting pedestals 43 and 44. This cover member 46 may conveniently comprise a preferably cylindrical shell having an open end threaded for detachable connection with a correspondingly threaded portion of the base 45, the opposite end of the cylindrical shell having an end closure wall 47. The cover 46 may comprise any suitable or preferred material, such as heavy cardboard or metal, having sufficient strength to guard the element 16 against accidental damage thereto. The cover, especially the end wall 47 thereof, preferably comprises material that is substantially transparent to the penetrating ray 14. If desired, however, the end wall may be formed as a collimator, by applying a layer of lead 47' or other ray opaque material thereon, and by forming such ray opaque layer with a central opening 47'', in axial alinement with the enclosed crystal 16.

It will be understood from the foregoing that the inspection device may be employed to operate the reject mechanism in response to decrease in the impedance of the detecting crystal below a preselected value, to thereby detect insufficiently filled containers. For such purpose, the switch 128 may be normally held open, as by suitable bias means such as a spring, and may close to operate the reject means in response to increased current flow in the coil 28, as a result of reduction in crystal impedance when the scanning beam penetrates an insufficiently filled container above its contents level, the beam being positioned to penetrate the contents of a correctly filled container, at the fill level, and hence to hold the impedance of the crystal at a value such that the coil 28 will not be energized sufficiently to close the switch 128 in response to inspection of a sufficiently filled container.

Such an arrangement is shown in Fig. 5 of the drawings, wherein the translation circuit 27 will be normally inoperative to actuate the amplifier 29 for the operation of the load device 28, when the scanning beam impinges on the sensitive element 16 at relatively low intensity, as when the beam passes through the contents of the container before reaching the element; but the system will become operable in response to increase in ray intensity and consequent reduction in crystal impedance, when the scanning beam impinges on the sensitive element 16 at relatively high intensity, as when the beam passes through an insufficiently filled container above the contents level thereof. Accordingly, the apparatus, as shown in Fig. 5, may be employed to determine whether or not successively inspected containers are filled to a predetermined minimum level, by disposing the ray beam 14 at the required level, so that insufficiently filled containers, when scanned by the beam, will cause the system 27 to operate the device 28 for the closure of the normally open switch 128 for the operation of the reject apparatus controlled thereby.

The apparatus, however, as shown in Fig. 6, may also be employed to inspect containers for overfilling above a selected fill level. For such purpose, the switch 128' controlled by the load device may be normally held closed, by suitable bias means. The scanning beam, also, may be positioned at a level to scan the containers immediately above the desired fill level, so as to hold the impedance of the crystal at a level such that the coil 28', comprising the load device, will be normally energized to hold the switch 128' open against its bias. When the beam 14 scans a container filled above the desired level, it will penetrate the container contents, thereby striking the crystal at reduced intensity. The resulting increase in crystal impedance will cause a sufficient reduction in the excitation of the coil 28' to allow the switch to close, under the influence of its associated bias means, and thus cause operation of the reject mechanism. The apparatus shown in Fig. 6 is thus arranged to respond only to the presence, in the scanning beam, of containers which are filled above a predetermined level. So long as the inspected containers are filled to levels at or below the scanning path of the beam 14, the translation circuit will energize the load device 28' to maintain the normally closed switch in open position; but said switch will close instantly and operate the reject mechanism in response to the presence, in the scanning beam, of a container filled to or above the level of the scanning beam.

Where the containers 11 are delivered in single file successively through the scanning beam 14 for the detection of insufficiently filled containers, by use of the system, as shown in Fig. 5, it will be seen that, during an interval between successive containers if the same be to any extent spaced apart, the X-ray beam may impinge upon the detector element 16 without passing through a container. Such circumstance may cause false operation of the load device, since the system shown in Fig. 5 will function to operate the reject mechanism when the scanning beam 14 impinges on the detector element 16 at an intensity in excess of that which prevails when the beam is screened by a container and its contents. In order to prevent false operation of the equipment under the conditions mentioned, a microswitch 42 may be mounted on the conveyor support structure in position to be operated only when a container thereon is in position to be scanned by the scanning beam.

The switch 42 may be operatively interconnected in any preferred or convenient fashion in order to prevent false operation of the load device 28 during any interval when there is no container in scanning position in the beam. To this end, the switch 42 may be arranged to control the operation of the load device 28, or to control the operation of the reject mechanism. Accordingly, the switch 42 may be connected to control the operating coil 48 of a relay switch 148 connected in series with the switch 128 and the operating coil of the reject mechanism. Alternately, the switch 148 may be connected in series with the coil 28. The switch 42, of course, may be either a normally open switch adapted to be closed by a container in scanning position, or it may be a normally closed switch adapted to be opened by a container in scanning position. Where the switch 42 is normally open, the switch 148 also may be normally open and operable to close when the relay coil 48 becomes energized in response to closure of the switch 42 by a container in scanning position. Where the switch 42 is a normally closed switch, the switch 148 may be of the normally closed type, held open so long as its coil 48 is energized, while the switch 42 remains closed, the switch 148, in such case, being adapted to open in response to the opening of the switch 42 by a container in scanning position.

It will be noted that, for overfill scanning purposes, with the system arranged as shown in Fig. 6, it will not be necessary to employ a switch 42 and relay 48 to provide protection against false operation of the equipment during intervals when the scanning beam passes unobstructedly to the element 16 through the gaps between successive containers moving on the conveyor 17, the system shown in Fig. 6 functioning to operate the reject mechanism only in response to decrease in the intensity with which the X-ray beam impinges upon the crystal. When the beam penetrates gaps between successive containers, it impinges on the crystal at increased intensity and hence will not cause false operation of the reject mechanism.

The present invention also may be applied for the simultaneous inspection of containers for over as well as underfilling. To this end, as shown more especially in Fig. 7, a pair of sensitive elements 16, 16' may be disposed one slightly above the other in the scanning beam 14, and each connected with a corresponding translation circuit 27, 27', respectively driving load devices having a normally open and a normally closed switch 128 and 128', so that, unless a container presented in the beam 14 for inspection be filled to a level intermediate the elements 16 and 16', either the load device controlled by the circuit 27, or the load device controlled by the circuit 27', will function to cause operation of the indicating, marking or ejecting equipment. The normally open switch 128, in that respect, will close if the contents fill level of the container be below the inspecting level of the element 16, while the normally closed switch 128', which is held open so long as the contents level in the container is below the level of the element 16', will close in the event that said contents level is above the inspection level of the element 16'. In such an arrangement it is necessary to provide means, such as the switch 42 and the relay 48, to prevent false operation of the reject mechanism through closure of the switch 128 during the interval between successive containers traveling on the carrier.

It is, of course, possible and within the contemplation of the present invention, in an arrangement of the sort shown in Fig. 7, to connect the switches 128 and 128' for the operation of separate marking devices for the application of unlike colors, and to arrange both switches, as shown, for the operation of container ejecting means, so that ejected containers will each bear a distinctive mark to show whether the same was ejected because of underfilling or overfilling.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Inspection apparatus comprising a source of X-rays of cyclically pulsating intensity, a ray sensitive semi-conductor element disposed in position to receive a ray from said source through a container, and means to measure the alternating current impedance of said semi-conductor element, as distinguished from the direct current resistance thereof, whereby to determine the presence or absence of container contents at the level of penetration of the ray therethrough.

2. Inspection apparatus comprising a source of X-rays of cyclically pulsating intensity, a ray sensitive semi-conductor element comprising crystalline cadmium sulphide disposed in position to receive a ray from said source through a container, and means to measure the alternating current impedance of said semi-conductor element, as distinguished from the direct current resistance thereof, whereby to determine the presence or absence of container contents at the level of penetration of the ray therethrough.

3. Inspection apparatus comprising a source of X-rays of cyclically pulsating intensity, a ray sensitive semi-conductor element comprising crystalline mercury sulphide disposed in position to receive a ray from said source through a container, and means to measure the alternating current impedance of said semi-conductor element, as distinguished from the direct current resistance thereof, whereby to determine the presence or absence of container conetnts at the level of penetration of the ray therethrough.

4. Inspection apparatus comprising a source of X-rays of cyclically pulsating intensity, a ray sensitive semi-conductor element comprising crystalline cadmium selenide disposed in position to receive a ray from said source through a container, and means to measure the alternating current impedance of said semi-conductor element, as distinguished from the direct current resistance thereof, whereby to determine the presence or absence of container contents at the level of penetration of the ray therethrough.

5. Inspection apparatus comprising a source of X-rays of cyclically pulsatnig intensity, a ray sensitive semi-conductor element disposed in position to receive a ray from said source, means to support a container in position between said source and element whereby to travel said ray through the container at a predetermined level, and means to measure the alternating current impedance of said semi-conductor element, as distinguished from the direct current resistance thereof, whereby to determine the presence or absence of container contents at the level of penetration of said ray therethrough.

6. Inspection apparatus comprising a source of X-rays of cyclically pulsating intensity, a ray sensitive semi-conductor element disposed in position to receive a ray from said source, conveyor means for moving a container between said source and element whereby to scan said container with said ray transversely at a predetermined level, and means to measure the alternating current impedance of said semi-conductor element, as distinguished from the direct current resistance thereof, whereby to determine the presence or absence of container contents at the level of penetration of said ray therethrough.

7. Inspection apparatus comprising a source of X-rays of cyclically pulsating intensity, a ray sensitive semi-conductor element disposed in position to receive a ray from said source, conveyor means for moving containers in succession between said source and element whereby to scan said containers successively with said ray transversely at a predetermined scanning level, and means to measure the alternating current impedance of said semi-conductor element, as distinguished from the direct current resistance thereof, whereby to determine the presence or absence of container contents at the level of penetration of said ray therethrough.

8. Inspection apparatus comprising a source of X-rays of cyclically pulsating intensity, a ray sensitive semi-conductor element disposed in position to receive a ray from said source, conveyor means for moving containers in succession between said source and element whereby to scan said containers successively with said ray transversely at a predetermined scanning level, means to measure, in terms of current flow therethrough, the alternating current impedance of said semi-conductor element, as distinguished from the direct current resistance thereof, whereby to determine the presence or absence of contents in each container at said level, and container reject means selectively operable in accordance with the value of said current flow for indicating containers in which the fill level of the contents thereof diverges from said scanning level.

9. Inspection apparatus comprising a source of X-rays of cyclically pulsating intensity, a ray sensitive semi-conductor element disposed in position to receive a ray from said source, conveyor means for moving containers in succession between said source and element whereby to scan said containers successively with said ray transversely at a predetermined scanning level, means to measure, in terms of current flow therethrough, the alternating current impedance of said semi-conductor element, as distinguished from the direct current resistance thereof, whereby to determine the presence or absence of contents in each container at said level, and container reject means selectively operable in accordance with the value of said current flow for indicating containers in which the fill level of the contents thereof extends below said scanning level.

10. Inspection apparatus comprising a source of X-rays of cyclically pulsating intensity, a ray sensitive semi-conductor element disposed in position to receive a ray from said source, conveyor means for moving containers in succession between said source and element whereby to scan said containers successively with said ray transversely at a predetermined scanning level, means to measure, in terms of current flow therethrough, the alternating current impedance of said semi-conductor element, as distinguished from the direct current resistance thereof, whereby to determine the presence or absence of contents in each container at said level, and container reject means selectively operable in accordance with the value of said current flow for indicating containers in which the fill level of the contents thereof extends above said scanning level.

11. Inspection apparatus comprising a source of X-rays of cyclically pulsating intensity, a ray sensitive semi-conductor element disposed in position to receive a ray from said source, conveyor means for moving containers in succession between said source and element whereby to scan said containers successively with said ray transversely at a predetermined scanning level, means to measure, in terms of current flow therethrough, the alternating current impedance of said semi-conductor element, as distinguished from the direct current resistance thereof, whereby to determine the presence or absence of contents in each container at said level, and container reject means selectively operable in accordance with the value of said current flow for indicating containers in which the fill level of the contents thereof diverges from said scanning level, said reject means comprising means for marking an incorrectly filled container in response to the scanning thereof by said ray.

12. Inspection apparatus comprising a source of X-rays of cyclically pulsating intensity, a ray sensitive semi-conductor element disposed in position to receive a ray from said source, conveyor means for moving containers in succession between said source and element whereby to scan said containers successively with said ray transversely at a predetermined scanning level, means to measure, in terms of current flow therethrough, the alternating current impedance of said semi-conductor element, as distinguished from the direct current resistance thereof, whereby to determine the presence or absence of contents in each container at said level, and container reject means selectively operable in accordance with the value of said current flow for indicating containers in which the fill level of the contents thereof diverges from said scanning level, said reject means comprising a pigment applicator operable to apply a daub of pigment upon an incorrectly filled container in response to the scanning thereof by said ray.

13. Inspection apparatus comprising a source of X-rays of cyclically pulsating intensity, a ray sensitive semi-conductor element disposed in position to receive a ray from said source, conveyor means for moving containers in succession between said source and element whereby to scan said containers successively with said ray transversely at a predetermined scanning level, means to measure, in terms of current flow therethrough, the alternating current impedance of said semi-conductor element, as distinguished from the direct current resistance thereof, whereby to determine the presence or absence of contents in each container at said level, and container reject means selectively operable in accordance with the value of said current flow for indicating containers in which the fill level of the contents thereof diverges from said scanning level, said reject means comprising means for ejecting an incorrectly filled container from said conveyor in response to the scanning thereof by said ray.

14. Inspection apparatus comprising a source of X-rays of cyclically pulsating intensity, a ray sensitive semi-conductor element disposed in position to receive a ray from said source, conveyor means for moving containers in succession between said source and element whereby to scan said containers successively with said ray transversely at a predetermined scanning level, means to measure, in terms of current flow therethrough, the alternating current impedance of said semi-conductor element, as distinguished from the direct current resistance thereof, whereby to determine the presence or absence of contents in each container at said level, and container reject means selectively operable in accordance with the value of said current flow for indicating containers in which the fill level of the contents thereof diverges from said scanning level, said reject means comprising container moving means disposed at one side of said conveyor and operable to eject an incorrectly filled container laterally from said conveyor means as said container passes out of said ray.

15. Inspection apparatus comprising a source of X-rays of cyclically pulsating intensity, a ray sensitive semi-conductor element disposed in position to receive a ray from said source through a container, means to measure the alternating current impedance of said semi-conductor element, as distinguished from the direct current resistance thereof, whereby to determine the presence or absence of container contents at the level of penetration of the ray therethrough, and ray regulating means normally serving to inactivate said inspection apparatus and operable by a container in inspecting position in said ray, to condition the inspection apparatus for operation.

16. Inspection apparatus comprising a source of X-rays of cyclically pulsating intensity, a ray sensitive semi-conductor element disposed in position to receive a ray from said source through a container, an operable load device, means to measure the alternating current impedance of said semi-conductor element, as distinguished from the direct current resistance thereof, whereby to determine the presence or absence of container contents at the level of penetration of the ray therethrough and to selectively actuate the load device in accordance with such determination, and a switch disposed in position to be actuated by a container in inspecting position in said ray, to control the operation of said load device.

17. Inspection apparatus comprising an X-ray generator forming a source of X-rays of cyclically pulsating intensity, collimator means defining a pencil-like ray emanating from said source, a ray sensitive semi-conductor element disposed in position in the path of said ray, conveyor means for moving containers in succession between said source and element whereby to scan said containers successively with said ray transversely at a predetermined scanning level, means to measure, in terms of current flow therethrough, the alternating current impedance of said semi-conductor element, as distinguished from the direct current resistance thereof, whereby to determine the presence or absence of contents in each container at said level, container reject means selectively operable in accordance with the value of said current flow for indicating containers in which the fill level of the contents thereof diverges from said scanning level, and switch means disposed in the path of movement of said containers and operable as each container is being scanned by said ray, said switch means being connected to disable the apparatus except when a container is in position intercepting said ray.

18. Inspection apparatus comprising an X-ray generator forming a source of X-rays of cyclically pulsating intensity, collimator means defining a pencil-like ray emanating from said source, a ray sensitive semi-conductor element comprising crystalline electron donor material disposed in position in the path of said ray, conveyor means for moving canisters forming liquid containers in rapid succession between said source and element whereby to scan said containers successively with said ray transversely at a predetermined scanning level, means to measure, in terms of current flow therethrough, the alternating current impedance of said element, as distinguished from the direct current resistance thereof, whereby to determine the presence or absence of contents in each container at said level, container reject means selectively operable in accordance with the value of said current flow for indicating containers in which the fill level of the contents thereof diverges from said scanning level, and switch means disposed in the path of movement of said containers and operable as each container is being scanned by said ray, said switch means being connected to disable the apparatus except when a container is in position intercepting said ray.

(References on following page)

References Cited in the file of this patent

UNITED STATES PATENTS

| | | |
|---|---|---|
| 2,179,859 | Page | Nov. 14, 1939 |
| 2,183,884 | Hait | Dec. 19, 1939 |
| 2,301,251 | Capen | Nov. 10, 1942 |
| 2,316,540 | Danley | Apr. 13, 1943 |
| 2,532,644 | Robinson | Dec. 5, 1950 |
| 2,543,039 | McKay | Feb. 27, 1951 |
| 2,604,596 | Ahearn | July 22, 1952 |

OTHER REFERENCES

The Photo-Conductivity of "Incomplete Phosphors" by R. Frerichs, Physical Review, Oct. 1, 1947, pages 594–601.

An Economical Industrial X-ray Detector by R. Frerichs et al., G. E. Review, August 1951, pages 42–45.